United States Patent [19]
Moriya

[11] 4,011,001
[45] Mar. 8, 1977

[54] LIQUID CRYSTAL DEVICE
[75] Inventor: Tokio Moriya, Chiba, Japan
[73] Assignee: Kabushiki Kaisha Daini Seikosha, Japan
[22] Filed: Mar. 14, 1975
[21] Appl. No.: 558,461
[30] Foreign Application Priority Data
Mar. 15, 1974 Japan .................. 49-29744
[52] U.S. Cl. .................. 350/160 LC; 58/50 R; 240/1 EL; 240/6.43
[51] Int. Cl.² .................. G02F 1/01; G04B 19/30
[58] Field of Search .................. 240/1 EL, 6.43; 58/50 R; 350/160 LC

[56] References Cited
UNITED STATES PATENTS
3,712,047  1/1973  Girard .................. 58/50 R
3,840,695  10/1974  Fischer .................. 350/160 LC X
3,864,905  2/1975  Richardson .................. 58/50 R Primary Examiner—George H. Miller, Jr.
Attorney, Agent, or Firm—Robert E. Burns; Emmanuel J. Lobato; Bruce L. Adams

[57] ABSTRACT

A liquid crystal device comprises a liquid crystal element disposed in a cavity formed between a pair of transparent base plates which have a circular shape. One or more cut-out or recess portions are formed at the side edge of said base plates, and a light source is mounted within the recess portion whereby the display face of said liquid crystal device is illuminated by said light source.

6 Claims, 3 Drawing Figures

LIQUID CRYSTAL DEVICE

BACKGROUND OF THE INVENTION

This invention relates to a liquid crystal device which incorporates its own light source.

In a conventional type of the liquid crystal device, said device depends upon ambient or natural light in order to illuminate the liquid crystal element and such is disadvantageous in that the display cannot be easily seen in a dark place.

Therefore it has been proposed to use a liquid crystal device which has its own light source to overcome this drawback, but such devices have not been found suitable for use in an electronic digital watch due to their large size.

Further the light source for lighting the liquid crystal should be of low power consumption according to the low power consumption of the liquid crystal device. Therefore, it is desirable that the light source be located as near as possible to the liquid crystal panel in order to illuminate said liquid panel by the light source of the low intensity.

OBJECT OF THE INVENTION

The present invention aims at eliminating the above noted difficulty and insufficiency, and therefore it is the primary object of the present invention to provide a liquid crystal device which has a light source for lighting said liquid crystal panel.

Another object of the present invention is to provide the liquid crystal device of a thin type which has the light source positioned in a recess portion of said liquid crystal panel.

SUMMARY OF THE INVENTION

According to the present invention, a liquid crystal device comprises a liquid crystal element contained in a cavity formed between a pair of circular transparent base plates, one or more recess portions formed at the side edge of said base plates, and a light source mounted within the recess portion whereby the display face of said liquid crystal device is illuminated by said light source.

BRIEF DESCRIPTION OF THE DRAWINGS

The above mentioned and further objects, features and advantages of the present invention will become more obvious from the following description when taken in connection with the accompanying drawings which show two preferred embodiments of the invention, and wherein.

DETAILED DESCRIPTION OF THE INVENTION

Figure 1:
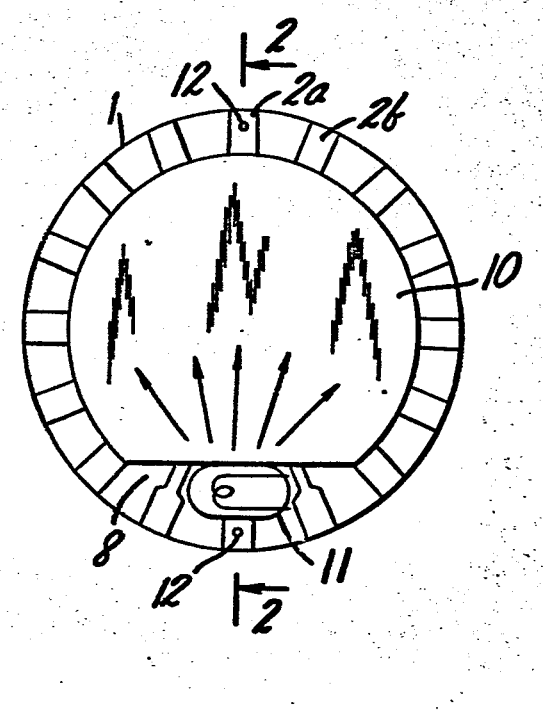
FIG. 1 is a rear or back view of the liquid crystal device according to the present invention.
Figure 2:
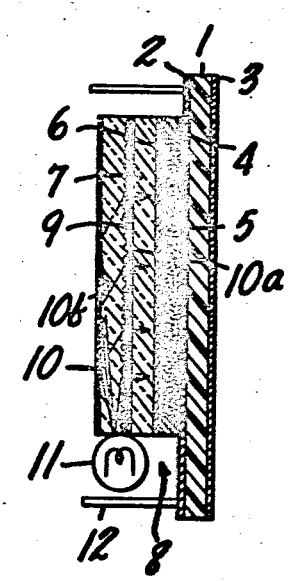
FIG. 2 is a cross sectional view taken along the line 2—2 of FIG. 1.

Referring now to the accompanying drawings, FIG. 1 and FIG. 2 show the liquid crystal device of the FE (Field Effect) type. The device comprises a first base plate 1 having a circular plate shape and having on the backside thereof an electrode 2 formed by a transparent conductive membrane. The electrode 2 has an array of electrode terminals 2a and 2b ... which extend radially outwardly to the outer peripheral surface of said first base plate 1.

A polarization plate 3 is mounted on the front or viewing surface of said first base plate 1.

An annular spacer 4 defines a cavity which contains the liquid crystal element 5 between said first base plate 1 and a transparent back electrode 6.

A second base plate 7 having a transparent circular shape is sandwiched between the back electrode 6 and a polarization plate 9 means defining cut-out a portion or recess 8 is formed at a side edge of the second base plate 7 by cutting at least one or more portions from the outer side portion of the base plate 7.

A reflective plate 10 made of transparent material and having the same shape as that of said second base plate 7 is attached to the backside of the polarization plate 9. The plate 10 has an irregular reflective face 10a which of grazed glass shaped to the front of display side of said reflective plate 10, and a mirrored reflective face 10b shaped to the backside of said reflective plate 10.

A light source 11 for lighting the liquid crystal element 5 is positioned within said cut-out portion 8 at the side edge of said second base plate 7 and said reflective plate 10. By such a construction, the liquid crystal device can be made very thin as compared to the conventional technique of disposing the light source behind rather than at the side of the sandwiched plates.

A connector terminal 12 makes electrical connection between the electrode terminals 2a and 2b and the other electrode.

Figure 3:
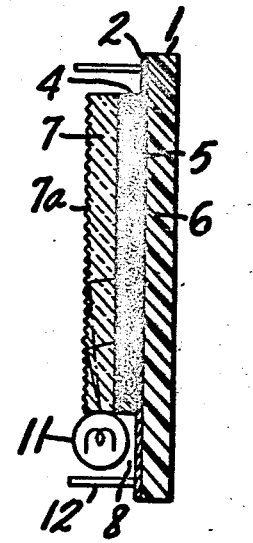
FIG. 3 is a cross sectional view of another embodiment of said liquid crystal device of the present invention.

FIG. 3 shows another embodiment of liquid crystal device of the "DSM" type and the same numerals as used in FIG. 2 are used in FIG. 3 to denote the same parts. In this embodiment, a reflective face 7a which has an irregular or rough surface portion is formed on the back face of the base plate 7 or there is no polarization plate 9 reflective plate 10.

In said liquid crystal device shown in FIG. 1 and FIG. 2, the light from said light source 11 positioned within said recess portion 8 is reflected by said reflective face 10b of said reflective plate 10, and then said light is irregularly or randomly reflected by said irregular reflective face 10a and directed toward said first base plate 1 or said light is directly reflected by irregular reflective face 10a whereby said light illuminates said liquid crystal panel from behind.

Further, in said liquid crystal device in FIG. 3, the light from said light source 11 which is positioned to said cut out portion 8 is directly and irregularly reflected by said irregular reflective face 7a and illuminates said liquid crystal panel from behind.

Therefore, said first and second base plates 1 and 7 are easily manufactured with a circular shape.

The light source is positioned to illuminate all of said display face effectively by using a light source of low power consumption. Furthermore, said light source is positioned so as not to obstruct or interfere with the connector electrode terminals 2a and 2b of said base plate 1.

What we claimed is:

1. A liquid crystal device for use in watches and the like comprising: first and second transparent base plates disposed in superposed spaced-apart relationship; a liquid crystal element sandwiched between said first and second base plates; means defining a recess in the peripheral side edge of said second base plate and said liquid crystal element; a light source disposed within said recess for illuminating said liquid crystal element; and means for directing light emitted from said light source toward said liquid crystal element.

2. A liquid crystal device according to claim 1; wherein said means for directing light emitted from said light source toward said liquid crystal element comprises a reflective plate composed of transparent material attached to the backside of said second base plate, said reflective plate having at one side a roughened face facing said second base plate and at the other side a mirrored reflective face.

3. A liquid crystal device according to claim 1; wherein said first and second base plates have a circular shape; and wherein said means defining a recess comprises a cut-out portion of said second base plate thereby forming a recess behind said first base plate.

4. A liquid crystal device according to claim 1; further including a plurality of electrodes disposed on the face of said first base plate which faces said liquid crystal element, said electrodes terminating in electrode terminals which extend radially outwardly in circumferentially spaced-apart relationship toward the periphery of said first base plate.

5. A liquid crystal device according to claim 4; wherein the size of said recess relative to the size of said light source is such that the thickness of said liquid crystal device is not increased by the presence of said light source.

6. A liquid crystal device according to claim 5; wherein said means for directing light emitted from said light source toward said liquid crystal element comprises a reflective face on the backside of said second base plate.

* * * * *